(12) United States Patent
Leadon (10) Patent No.: US 6,725,697 B1
(45) Date of Patent: Apr. 27, 2004

(54) KEYWAY CYLINDER PLUG REMOVAL TOOL FOR A SAFETY DEPOSIT BOX

(75) Inventor: Kevin P. Leadon, Yakima, WA (US)

(73) Assignee: Kkevin P. Leadon, Yakima, WA (US)

( * ) Notice: Subject to any disclaimer, the term of this patent is extended or adjusted under 35 U.S.C. 154(b) by 0 days.

(21) Appl. No.: 10/186,936

(22) Filed: Jun. 28, 2002

(51) Int. Cl.$^7$ .................... B23B 41/00; B23P 19/00; E05B 63/00
(52) U.S. Cl. ................ 70/465; 29/426.1; 29/426.4; 408/79; 408/201; 408/204
(58) Field of Search .................. 70/465, 394, 417; 29/426.1, 426.4; 408/201, 204, 209, 79, 80

(56) References Cited

U.S. PATENT DOCUMENTS

| | | | | |
|---|---|---|---|---|
| 4,122,695 A | * | 10/1978 | Hall | 70/417 |
| 4,261,093 A | * | 4/1981 | Steffen et al. | 29/426.4 |
| 4,307,983 A | * | 12/1981 | Blough et al. | 29/426.4 X |
| 4,406,140 A | * | 9/1983 | Wolter | 70/231 |
| 4,586,233 A | * | 5/1986 | Markisello | 29/426.4 |
| 4,682,398 A | * | 7/1987 | Markisello | 29/426.4 |
| 5,167,475 A | * | 12/1992 | Miyanaga | 408/204 |
| 5,184,490 A | * | 2/1993 | Takahashi | 70/277 |
| 5,701,773 A | * | 12/1997 | Markisello | 70/465 |
| 5,928,238 A | * | 7/1999 | Scarborough et al. | 606/79 |
| 5,987,946 A | * | 11/1999 | Watts | 70/394 |
| 6,116,827 A | * | 9/2000 | Moser et al. | 408/204 |
| 6,305,885 B1 | * | 10/2001 | Linthicum | 408/1 R |

* cited by examiner

Primary Examiner—Lloyd A. Gall
(74) Attorney, Agent, or Firm—Stratton Ballew PLLC (57) ABSTRACT

A keyway cylinder plug removal tool specifically configured for the removal of a lock core or cylinder plug from a safety deposit box. The tool includes a shaft received within a hole saw housing, the hole saw housing including a plurality of teeth, positioned about a cutting cylinder. The hole saw housing includes a shank. The shaft including a keyway end and a free end. The free end fits into the shank of the hole saw housing and a keyway tab attaches to the keyway end of the shaft. The keyway tab inserts into a keyway of a cylinder plug. Once the cylinder plug is removed, the latch bolt of the lock can be retracted, to open the safety deposit box. The keyway tab is typically flat and free of cut indentations or "keying," but is generically insertable into most manufactures' proprietary keyway shapes. The keyway tab attached to the keyway end of the shaft. A shaft spring is received onto the shaft and abuts against the holesaw housing. The shaft spring includes a spring shank end and a spring keyway end. The free end of the shaft is receivable into a chuck of a drill. The cutting cylinder cuts away to removes the retaining lip of the cylinder housing allowing the extraction of the cylinder plug, within.

9 Claims, 8 Drawing Sheets

KEYWAY CYLINDER PLUG REMOVAL TOOL FOR A SAFETY DEPOSIT BOX

TECHNICAL FIELD

The invention relates to a method and apparatus for keyway cylinder plug removal tool, and more particularly to a cylinder plug removal tool that is especially effective for use in safety deposit boxes. With the keyway cylinder plug removal tool of the present invention, the safety deposit box can be quickly and efficiently opened by a professional locksmith with a minimum of damage to the box.

BACKGROUND OF THE INVENTION

Safety deposit boxes are considered difficult open or "crack" without the proper access keys. When a key is lost by a client or renter keyholder, a professional locksmith is typically called to open the box, hopefully with a minimum of damage to the lock mechanism. Conventionally, to open a safety deposit box without a renter key requires a skilled locksmith, who must perform several tedious and exacting steps to break open the lock mechanism. For even a skilled locksmith, this operation can be time consuming and difficult. The theft resistant deposit box is designed to thwart just such a effort. The opening can easily result in injury to the locksmith and expensive repairs to the deposit box and its lock mechanism.

The present invention will be better understood by reference to the following detailed description taken in conjunction with the accompanying drawings.

DETAILED DESCRIPTION OF SPECIFIC EMBODIMENTS

The invention provides a keyway cylinder plug removal tool that is especially effective for use in opening safety deposit boxes. A preferred embodiment of the keyway cylinder plug removal tool, or "removal tool" 20 is shown in FIGS. 1 through 16. The removal tool provides an efficient and quick solution to the problem of opening safety deposit boxes of a conventional design, for which the renter's or client's keys have been lost or misplaced.

The safety deposit box of the conventional design includes a lock 10. The lock is located in the outward, exposed end of the safety deposit box. The lock includes a lock body 11, which is typically covered by a "cover plate" or faceplate 12.

The lock body 11 and the faceplate 12 enclose a lock mechanism 13. The conventional lock mechanism includes a latch bolt 15 controlled by a set of levers 16, which are actuated by a cam 14. To turn the cam, the conventional lock mechanism also includes two cylinder plugs 17, also referred to as "plugs," which receive keys to rotate the cam and so operate the lock. A renter keyway cylinder plug 18 receives a renter or client key and a guard keyway cylinder plug 19 receives a guard key. The renter key is held and used by the person renting the safety deposit box, typically to store valuables, papers or what ever the renter desires. The guard key is kept by the bank or institution that keeps and maintains the safety deposit box. Both keys are required to open this conventional lock. Only when both the renter key and the guard key are inserted and turned in their respective keyway cylinder plugs, can the latch bolt be retracted into the lock body and the safety deposit box opened. The safety deposit boxes are placed in an array with substantially only the cylinder plugs of the lock exposed.

Figure 5:
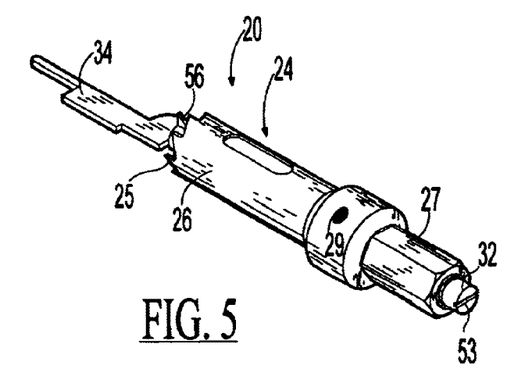
FIG. 5 is a perspective view of a keyway cylinder plug removal tool, according to an embodiment of the invention.
Figure 6:
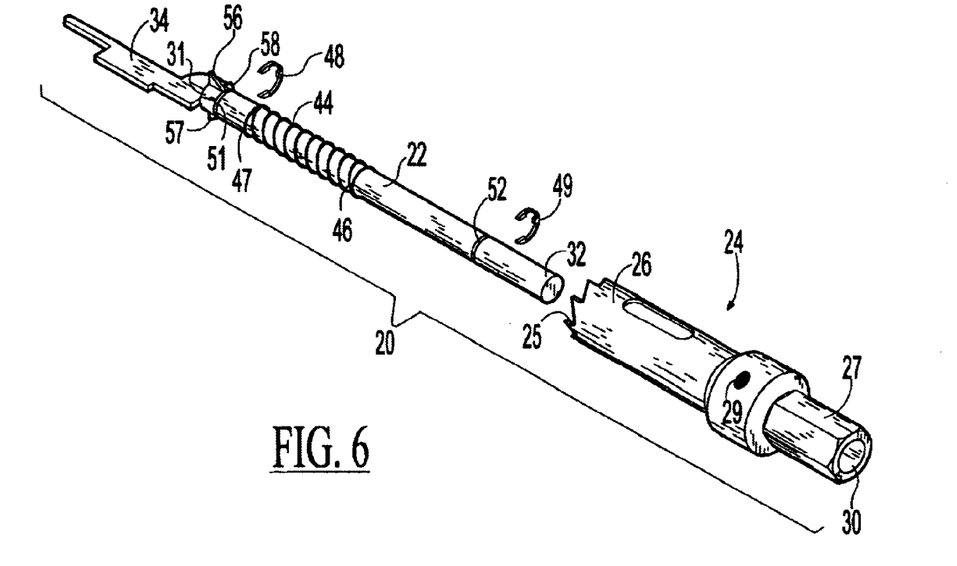
FIG. 6 is a partially exploded perspective view of a keyway cylinder plug removal tool, according to an embodiment of the invention.
Figure 7:
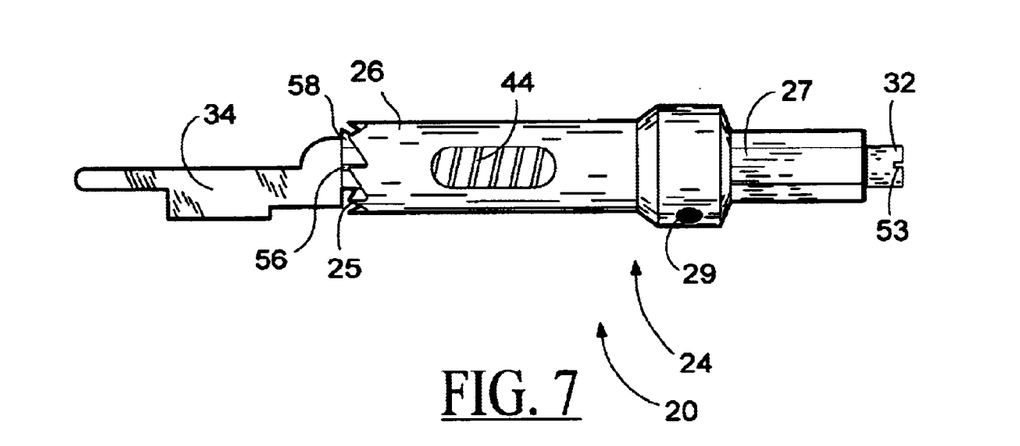
FIG. 7 is a side view of a keyway cylinder plug removal tool, according to an embodiment of the invention.
Figure 8:
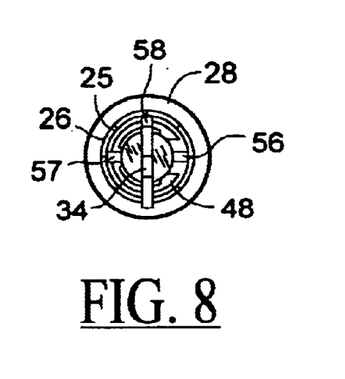
FIG. 8 is an end view of a keyway cylinder plug removal tool, according to an embodiment of the invention.
Figure 9:
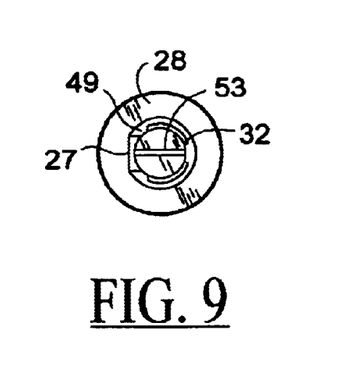
FIG. 9 is an end view of a keyway cylinder plug removal tool, according to an embodiment of the invention.
Figure 10:
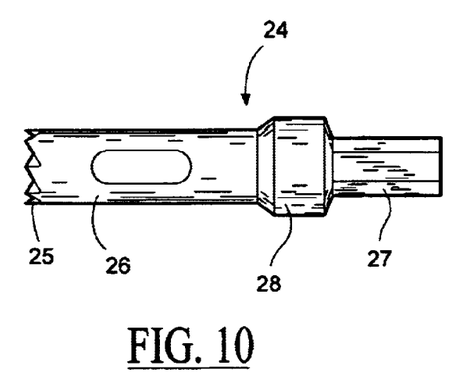
FIG. 10 is a side view of a portion of a keyway cylinder plug removal tool, according to an embodiment of the invention.
Figure 11:
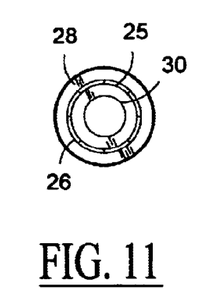
FIG. 11 is an end view of a portion of a keyway cylinder plug removal tool, according to an embodiment of the invention.
Figure 12:
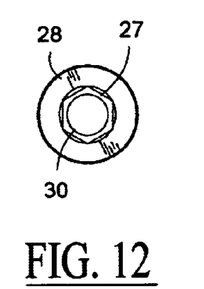
FIG. 12 is an end view of a portion of a keyway cylinder plug removal tool, according to an embodiment of the invention.
Figure 13:
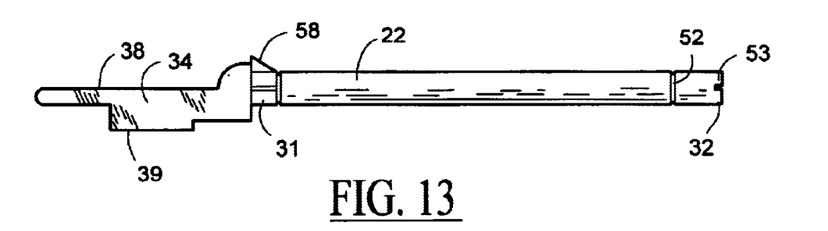
FIG. 13 is a side view of a portion of a keyway cylinder plug removal tool, according to an embodiment of the invention.
Figure 14:
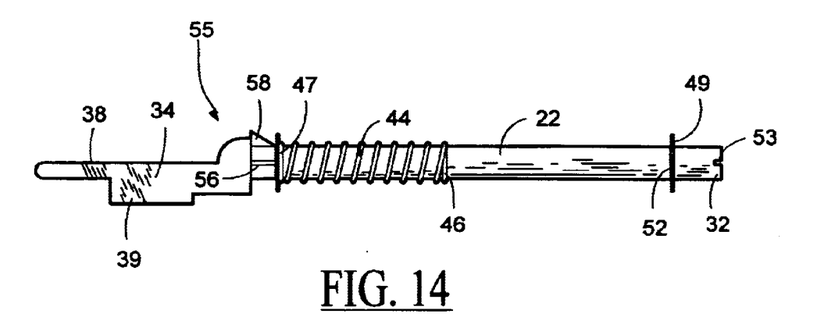
FIG. 14 is a side view of a portion of a keyway cylinder plug removal tool, according to an embodiment of the invention.
Figure 15:
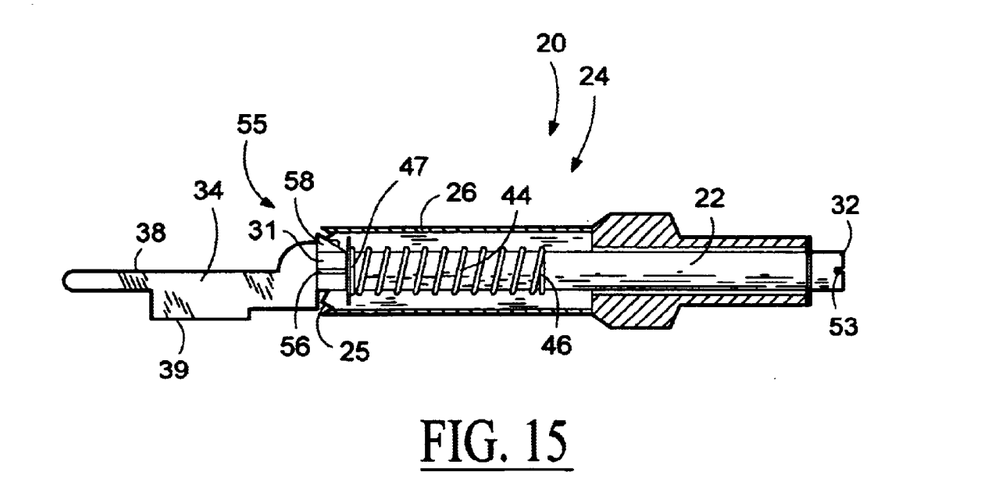
FIG. 15 is a partially sectioned top view of a keyway cylinder plug removal tool, according to an embodiment of the invention.
Figure 16:
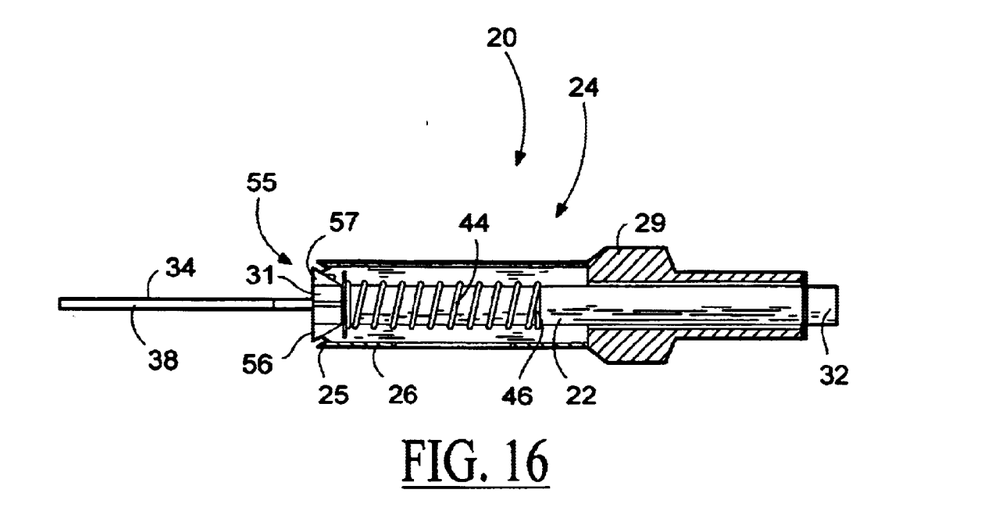
FIG. 16 is a partially sectioned side view of a keyway cylinder plug removal tool, according to an embodiment of the invention.

As detailed in FIGS. 5 and 6, the removal tool 20 of the present invention includes a shaft 22, received within a hole saw housing 24. The hole saw housing has a plurality of teeth 25 or "teeth," positioned about a cutting cylinder 26. The cutting cylinder is as typically found in a conventional hole saw, preferably with the teeth especially configured for the cutting of metal materials. The teeth can be hardened, preferably by a conventional heat treatment. Carbide tipping is also considered as an alternate treatment or compositional choice for the teeth of the cutting cylinder.

The hole saw housing 24 attaches to a shank 27. Most preferably, a center body 28 is included between the cutting cylinder and the shank, joining the cutting cylinder to the shank. The center body serves the purpose of strengthening the joining and provide a location for an optional set screw receiver 29, discussed later herein. The shank includes a shaft receiver 30 for receiving the shaft 22.

Figure 2:
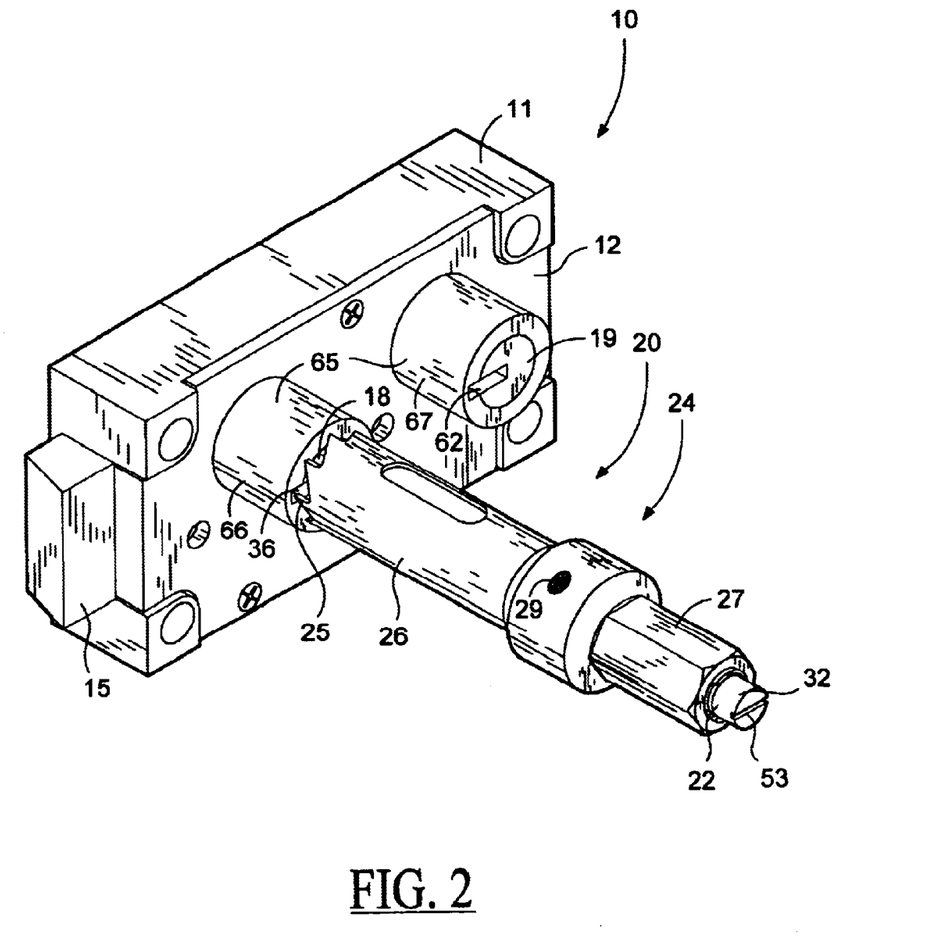
FIG. 2 is a perspective view of a keyway cylinder plug removal tool and lock, according to an embodiment of the invention.
Figure 3:
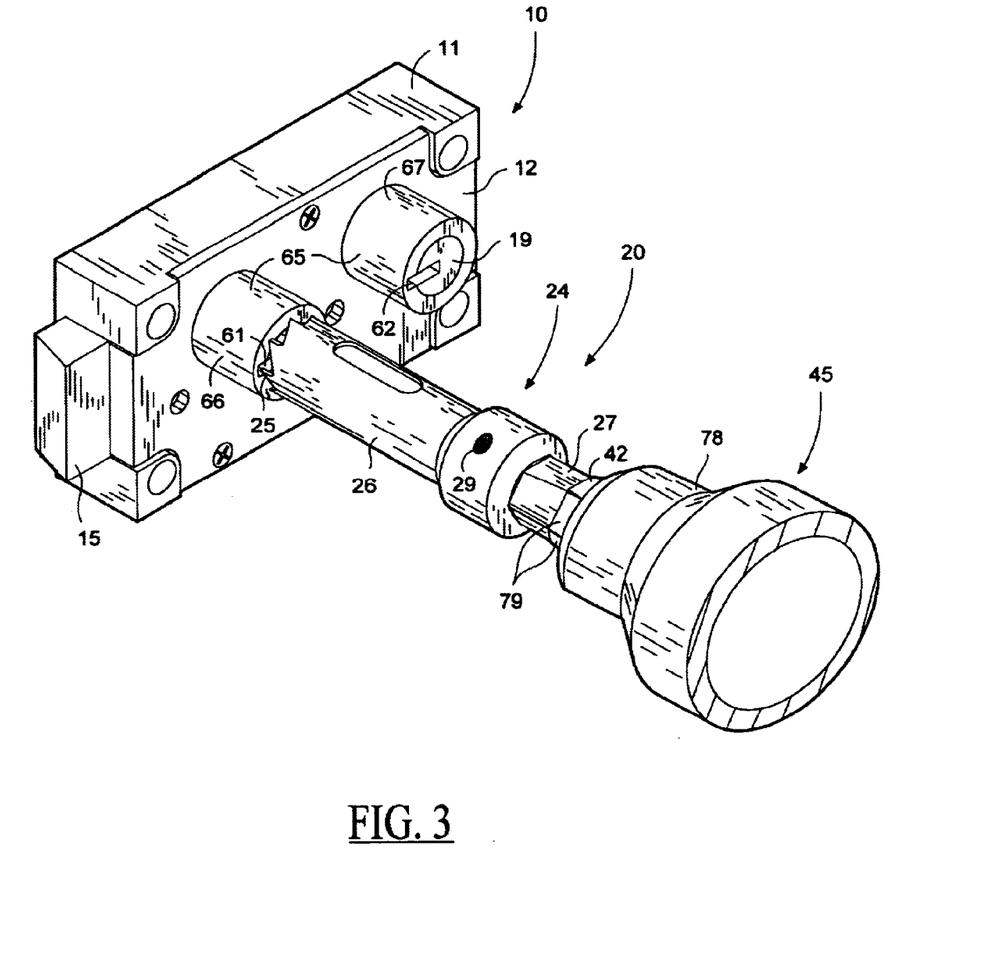
FIG. 3 is a perspective view of a keyway cylinder plug removal tool, lock and drill head, according to an embodiment of the invention.
Figure 4:
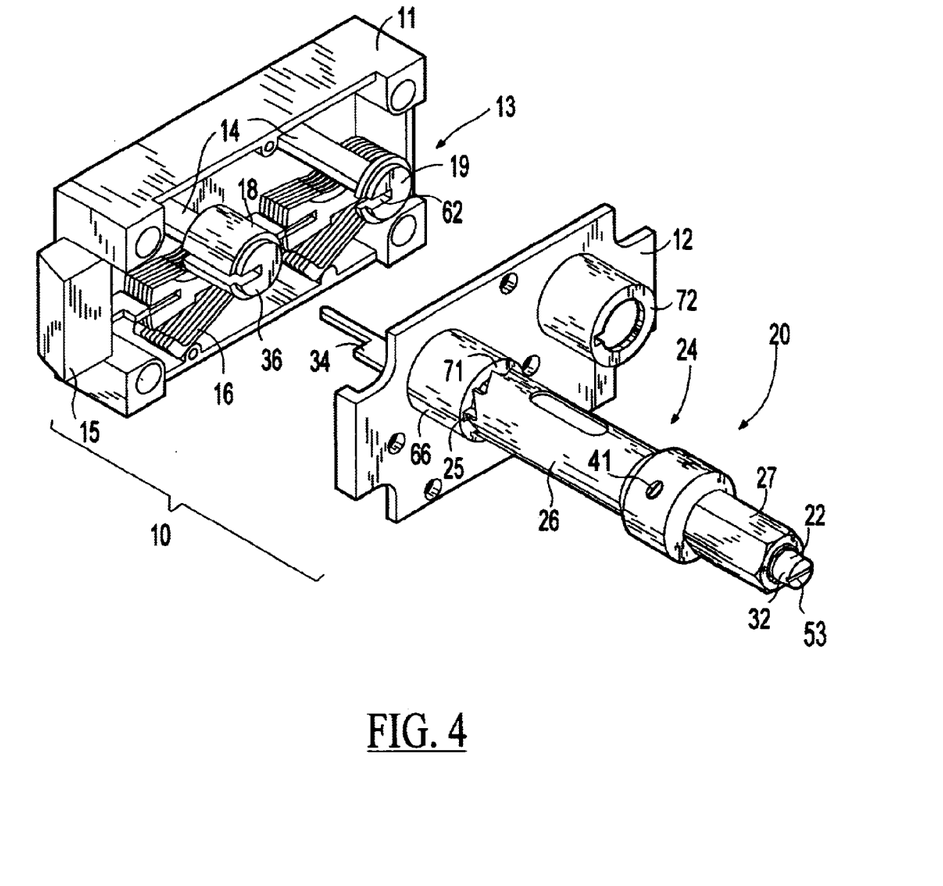
FIG. 4 is a partially exploded perspective view of a keyway cylinder plug removal tool, according to an embodiment of the invention.

The shaft 22 has a keyway end 31 and a free end 32. The free end fits into the shaft receiver 30 and a keyway tab 34 attaches to the keyway end of the shaft 22. The keyway tab inserts into a keyway of one of the cylinder plugs 17, as shown in FIGS. 2, 3, and 4. The keyway of the renter keyway cylinder plug 18 includes a renter keyway 36. The renter keyway receives the renter key, which turns the renter keyway cylinder plug to retract the latch bolt 15, and so opens the safety deposit box.

The keyway tab 34 includes an upper tab edge 38, which is typically flat and free of cut indentations or "keying," but generically insertable into most manufactures' proprietary keyway shapes. The keyway tab also includes a lower edge 39, which can be subtlety unique for each manufacturer's proprietary lock cylinder. In a preferred embodiment of the present invention, as shown in FIGS. 1 through 16, the keyway tab is configured for a typical "Sargent and Greenleaf®" or S&G® brand of lock 10. This preferred shape inserts and engages or "hooks" into a unique, manufacturer specific keyway. The keyway tab can be interchangeable on the shaft 22, or the entire shaft can be changed out, as preferred.

Most preferably, the shaft 22 is approximately 4 inches in length and formed from approximately ¼ inch diameter round stock, which can be cold rolled and preferably a machine grade steel. The keyway tab, which extends from the shaft, is preferably a flat steel, approximately 1 and ¼ inches in length, and approximately ¼ inches wide, with a thickness of ⅛ inches.

The term "approximately" is used in this specification in relation to measurements of preferred embodiments that are understood to be variable by a person skilled in the pertinent art, to achieve the purposes of the invention. The varying of these approximate dimensions may be required to match the specific dimensions of the lock 10, to which the removal tool 20 is employed. Such variations are well within the scope of the present invention. Specifically, alternative shapes of the keyway tab 34 are included in the scope of the present invention. A locksmith, skilled in the opening of safety deposit boxes, is familiar with the required shape of flat stock required to "hook" into the keyway of any particular manufacturers' specific design. This shape can vary from model to model of lock 10.

As shown in FIG. 2, the keyway tab 34 is firmly and immovably attached to the keyway end 31 of the shaft 22. Preferably, the keyway tab is welded onto the shaft. However a threaded attachment, most preferably with a set screw 41 to prevent inadvertent uncoupling of the keyway tab from the shaft is a possible alternative to a welded attachment. An additional alternative is to drop forge the keyway tab from a single piece of round stock that forms the shaft. Again, the shaft is preferably approximately ¼ inches in diameter, which may vary as necessary or desirable. The free end 32 of the shaft is receivable into a chuck 42 of a drill 45, shown in FIG. 3.

The shank 27 of the holesaw housing 24 should have a length sufficient to be received into the chuck 42 and a diameter that does not exceed the abilities of the chuck to grasp, while the free end of the shaft 32 preferably extends out of the shaft receiver 30 and beyond the shank, so the free end can be actuated or moved independently of the shank, as shown in FIG. 4.

Preferably, as shown in FIG. 6, a shaft spring 44 is received onto the shaft 22. The shaft spring abuts against the holesaw housing 24, preferably against the center body 28 of the holesaw housing. Most preferably, the shaft spring includes a spring shank end 46 and a spring keyway end 47. A keyway clip 48 is received proximate to the keyway end 31 of the shaft, and a shank clip 49 is received proximate to the free end of the shaft. With the keyway spring end abutting to a keyway clip 48 as detailed in FIGS. 14, 15 and 16, the shaft spring prevents the holesaw housing from inadvertently sliding along the shaft, covering the keyway tab. Instead, the hole saw housing is maintained against the shank clip. The shank clip and the keyway clip are preferably conventional "spring clips," which are thin, light and typically punched from a high tensile strength metal. The clips each fit into guides cut into the shaft. The keyway clip inserts onto a keyway clip guide 51 and the shank clip likewise onto a shank clip guide 52, as shown in FIG. 6.

To assemble the removal tool 20 for use, the keyway clip 48 is first inserted onto the keyway guide clip 51. After sliding the shaft spring 44 onto the shaft 22, the holesaw housing 24 can be inserted onto the shaft, as shown in FIGS. 5 and 6. Then, the shank clip 49 can be placed in the shank clip guide 52, proximate to the free end 32 of the shaft. This placement of the shank clip preferably allows a short distance of the shaft, approximately ⅛ inch to ¼ inch. The holesaw housing slides along the shaft against the tension of the shaft spring, which serves to maintain the holesaw housing against the shank 27 of the holesaw housing.

In a preferred embodiment of the present invention, the free end 32 of the shaft 22 includes a screw driver slot 53 to aid in turning the shaft. The screwdriver slot can be utilized to turn the shaft with a screwdriver, thereby rotating the keyway tab 34 within the keyway 60.

While cutting with the removal tool 20, the shaft 22 must be kept on center within the cutting cylinder 26. In a preferred alternative embodiment of the present invention, the removal tool can be configured to better maintain the cutting cylinder 26 of the hole saw 24 in proper, centered position about the shaft. To aid in maintaining the shaft in the center of the cutting cylinder, a plurality of centering fins 55 can be utilized. The centering fins are located proximate to the spring keyway end 47 of the shaft, as shown in FIGS. 6, 7, 8, 13, 14, 15 and 16. As detailed in FIG. 6, a first centering fin 56 is positioned opposite a second centering fin 57, both normal to or at a 90 degree angle relative to the keyway tab 34. A third centering pin 58 is preferably positioned in the same plane as the keyway tab, proximate to the upper tab edge 38 of the keyway tab, as detailed in FIGS. 14 and 15. Each of the plurality of centering fins are preferably pointed in shape to minimize contact with the cutting cylinder as it rotates. Other positions of the plurality of centering fins, extending from either or both the shaft and the cutting cylinder, and alternative shapes of the centering fins, such as rounded and flattened, are all considered within the scope of the present invention. The inventor has found that the shank 27 and the center body 28 of the holesaw serve to adequately maintain the shaft in the centered position for most configurations of the removal tool.

Figure 1:
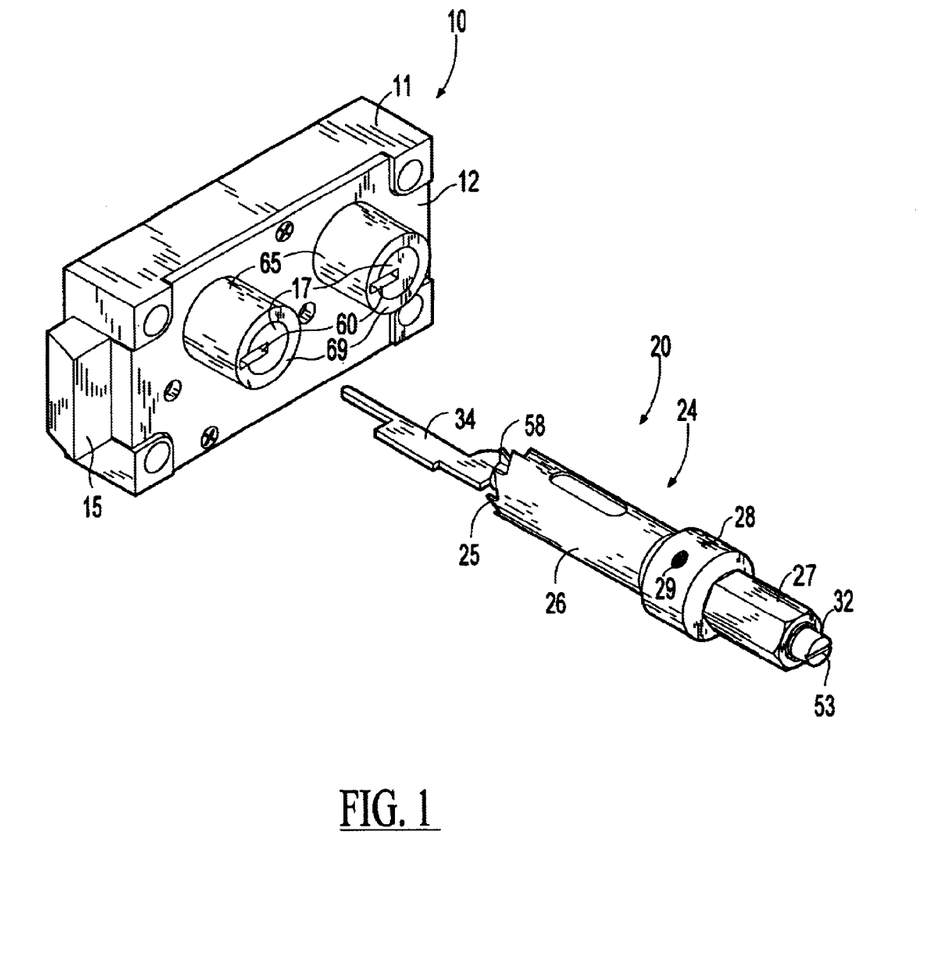
FIG. 1 is a perspective view of a keyway cylinder plug removal tool and lock, according to an embodiment of the invention.

To use the removal tool 20, in accordance to a preferred embodiment of the present invention, the keyway tab 34 is oriented to insert into a keyway 60, as shown in FIG. 1. The keyway, as shown, is the renter keyway 36 of the renter keyway cylinder plug 18. Similarly, the guard keyway cylinder plug 19 includes a guard keyway 62. Therefore, the removal tool could alternatively be employed on guard keyway cylinder plug, by inserting the keyway tab into the guard keyway.

After the removal tool 20 is inserted into the keyway 60, as shown in FIG. 2. The teeth 25 of the cutting cylinder 26 are preferably separated or retracted from the cylinder plugs 17, held in this retracted position by the shaft spring 44.

Specifically, the faceplate 12 includes cylinder housings 65, which receive the cylinder plugs. A renter cylinder housing 66 receives the renter keyway cylinder plug and a guard cylinder housing 67 receives the guard keyway cylinder plug 19. Each cylinder housing retains its respective cylinder plug within, by a retaining lip 69. A renter retaining lip 71 keeps the renter keyway cylinder plug within the renter cylinder housing, and a guard retaining lip 72 keeps the guard keyway cylinder plug within the guard cylinder housing.

The shaft of the removal tool 20 is now turned 90 degrees until it "stops," typically counter clockwise, to engage, or hook, the keyway tab 34 into the keyway 60. Depending on the "handedness" of the lock, turning the shaft of the removal tool 90 degrees clockwise may be required to hook the keyway. Optionally, a set screw 75 can be inserted into the setscrew receiver 29 of the center body 28, to interlock the holesaw housing 24 to the shaft 22. This allows a wrench or similar tool to be employed on the shank 27 and aid in turning the shaft within the keyway, if needed. Once the keyway tab is locked within the keyway, the set screw is disengaged or removed and the holesaw housing again freely rotates about the shaft.

The drill 45 is now attached to the shank 27 of the removal tool 20 as shown in FIG. 3. The drill is of a conventional design and configuration, and so includes a drill head 78 that rotates upon a drill motor (not shown). The chuck 42 extends from the drill head. The chuck receives drill bits and the like, within a set of opposing jaws 79. The chuck can also receive the shank of the removal tool and is tightened to firmly grasp the shank and so power the rotation of the holesaw housing 24 about the shaft 22. The shaft remains fixed and stationary with the keyway tab, firmly held in the keyway 60 of the lock 10 as the holesaw housing 24 is rotated. As an alternative to the drill, a socket driver, either pneumatic or electric or any equivalent tool could be employed to rotate the holesaw on the shaft.

The removal tool 20 is now ready to cut into the cylinder housing 65. Specifically, the cutting cylinder 26 cuts away and so removes the retaining lip 69 of the cylinder housing. This cutting allows the extraction of the cylinder plug 17 within. Preferably, the teeth 25 of the cutting cylinder are pressed against the retaining lip of the cylinder housing with manual pressure on the drill, so that the holesaw housing 24 moves along the shaft, against the slight tension pressure of the shaft spring 44.

As shown in FIG. 3, the drill 45, which is preferably an electric motorized or pneumatic hand tool as described above, is then activated to engage the teeth 25 against the renter retaining lip 71. As the holesaw housing 24 rotates, the teeth remove material from the renter retaining lip, until the renter retaining lip is removed. The penetration into the renter cylinder housing 66 is approximately ⅛th of an inch, depending upon the configuration and design of the lock 10. When the retaining lip 69 is cut away, the cylinder plug 17, namely the renter keyway cylinder plug 18 in the present example, is ready for extraction.

To extract the cylinder plug 17, the removal tool 20 is first removed from the keyway 60. The keyway tab 34 of the removal tool is rotated to disengage the keyway tab from the keyway, by rotating it in a reverse direction of the above described "insertion" and "hook" steps, typically clockwise, again depending on the handedness of the lock.

The cam 14 of the lock 10 can now be removed, preferably with a pair of needlenose pliers. The latch bolt 15 is then retracted, preferably also with a needlenose plier, or preferably achieved with a "hook tool," which is a handled hooked rod tool, well known to most persons skilled in the locksmith field. The faceplate 12 of the lock is irreparably damaged by the above process, so must be replaced. However this is of small consequence when compared to the time and effort saved by the present invention, especially when compared to the alternative of a radical removal of the entire lock, which destroys the lock irreparably.

The removal tool 20 of the present invention can be employed for all known safety deposit lock systems of conventional design. The models of lock 10 known to work with the present invention include; S&G® 4440, Ilco® A400, Diebold® 175-05, Ilco® P57, S&G® 4442, S&G® 4443, Yale® 231, Yale® 201, and the, Lefebure® 7300 series (including 7300 through 7302).

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A lock core removal tool comprising:
   a shaft including a keyway end opposite a free end,
      the free end of the shaft receivable into a holesaw housing,
      the holesaw housing including a shank and a cutting cylinder,
      the cutting cylinder including a plurality of teeth positioned about the cutting cylinder;
   a keyway tab attached to the keyway end of the shaft,
      the keyway tab insertable into a keyway of a lock,
      the lock including a cylinder plug surrounded by a cylinder housing,
      the holesaw rotatable about the shaft to cut away a portion of the cylinder housing to release the cylinder plug from the lock; and
   a centering fin, the centering fin mounted proximate the keyway end of the shaft, the centering fin for centering the shaft within the cutting cylinder of the holesaw housing.

2. The lock core removal tool of claim 1, further comprising a shaft spring, the shaft spring mounted upon the shaft, the shaft spring for maintaining the holesaw housing on the shaft, away from the keyway tab.

3. The lock core removal tool of claim 1, wherein holesaw housing is rotatable about the shaft by a power drill.

4. The lock core removal tool of claim 1, wherein the keyway tab has a shape that is specific for the keyway of the cylinder plug.

5. A lock core removal tool comprising:
   a shaft receivable into a cutting cylinder,
      the cutting cylinder including a plurality of teeth positioned about the cutting cylinder;
   a keyway tab attached to the shaft proximate to the cutting cylinder,
      the keyway tab insertable into a keyway of a lock, the lock including a cylinder plug surrounded by a cylinder housing, the cutting cylinder rotatable about the shaft to cut away a portion of the cylinder housing; and a shaft spring, the shaft spring mounted upon the shaft, the shaft spring for maintaining the cutting cylinder on the shaft, away from the keyway tab.

6. The lock core removal tool of claim 5, further comprising a centering fin, the centering fin mounted on the shaft proximate to the keyway tab, the centering fin for centering the shaft within the cutting cylinder.

7. A method for removing a lock core comprising the steps of:

a) inserting a keyway tab of a removal tool into a keyway of the lock core, the tool comprising a shaft and a holesaw housing, the shaft including a keyway end opposite a free end, the free end of the shaft receivable into the holesaw housing, the holesaw housing including a shank and a cutting cylinder, the cutting cylinder including a plurality of teeth positioned about the cutting cylinder, and a keyway tab attached to the keyway end of the shaft, keyway tab insertable into a keyway of a lock, the lock including a cylinder plug surrounded by a cylinder housing, the holesaw rotatable about the shaft to cut away a portion of the cylinder housing to release the cylinder plug from the lock;

b) turning the keyway tab to engage the shaft into the keyway;

c) removing a portion of the cylinder housing with the holesaw;

d) turning the keyway tab to disengage the shaft from the keyway;

e) retracting the keyway tab of the removal tool from the keyway f) extracting the cylinder plug from the cylinder housing; and g) retracting the bolt to open the lock.

8. The lock core removal method of claim 7, wherein the step of removing a portion of the cylinder housing with the holesaw additionally includes the step of:

c1) rotating the holesaw housing to engage the teeth of the holesaw housing against the cylinder housing.

9. The lock core removal method of claim 8, wherein the step of rotating the holesaw housing to engage the teeth of the holesaw housing against the cylinder housing additionally includes the step of:

c2) attaching a powered drill to the shank of the holesaw housing to rotate the holesaw housing.

* * * * *

UNITED STATES PATENT AND TRADEMARK OFFICE
CERTIFICATE OF CORRECTION

PATENT NO.   : 6,725,697 B1                                                      Page 1 of 1
DATED        : April 27, 2004
INVENTOR(S)  : Kevin P. Leadon It is certified that error appears in the above-identified patent and that said Letters Patent is
hereby corrected as shown below:

<u>Title page,</u>
Item [73], "Kkevin P. Leadon" to -- Kevin P. Leadon --

Signed and Sealed this

Thirty-first Day of August, 2004

JON W. DUDAS
*Director of the United States Patent and Trademark Office*